United States Patent
Dion et al.

(10) Patent No.: US 10,153,941 B2
(45) Date of Patent: Dec. 11, 2018

(54) DISTRIBUTED OPERATIONAL CONTROL IN COMPUTING SYSTEMS

(71) Applicant: Microsoft Technology Licensing, LLC, Redmond, WA (US)

(72) Inventors: David Dion, Bothell, WA (US); James Johnson, Bellevue, WA (US); Marcus Fontoura, Clyde hill, WA (US); Milan Vukosavljevic, Bellevue, WA (US); Mark Russinovich, Hunts Point, WA (US); Gopal Kakivaya, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 185 days.

(21) Appl. No.: 15/157,196

(22) Filed: May 17, 2016

(65) Prior Publication Data

US 2017/0339008 A1 Nov. 23, 2017

(51) Int. Cl.
*H04L 12/24* (2006.01)
*G06F 9/50* (2006.01)
*H04L 12/46* (2006.01)
*H04L 29/08* (2006.01)

(52) U.S. Cl.
CPC ............ *H04L 41/08* (2013.01); *G06F 9/5072* (2013.01); *H04L 12/4641* (2013.01); *H04L 67/10* (2013.01)

(58) Field of Classification Search
CPC ...... H04L 41/08; H04L 12/4641; H04L 67/10
See application file for complete search history.

(56) References Cited

U.S. PATENT DOCUMENTS

| | | | |
|---|---|---|---|
| 7,596,620 B1 * | 9/2009 | Colton | G06F 8/10 709/201 |
| 8,935,375 B2 | 1/2015 | Dournov et al. | |
| 9,043,458 B2 | 5/2015 | Balaji et al. | |
| 2006/0075408 A1 | 4/2006 | Powers et al. | |
| 2008/0275939 A1 * | 11/2008 | Martin | G06F 8/61 709/203 |
| 2010/0050172 A1 * | 2/2010 | Ferris | G06F 9/4856 718/1 |
| 2010/0319004 A1 | 12/2010 | Hudson et al. | |

(Continued)

OTHER PUBLICATIONS

Nurmi et al. "The Eucalyptus Open-source Cloud-computing System". 9th IEEE/ACM International Symposium on Cluster Computing and the Grid. 2009. pp. 124-131.*

(Continued)

*Primary Examiner* — John M MacIlwinen
(74) *Attorney, Agent, or Firm* — Liang IP, PLLC

(57) ABSTRACT

Certain embodiments of computing systems, devices, components, modules, routines, and processes for implementing distributed operational control in a computing fabric are described herein. In one embodiment, a method includes receiving, at a control cluster, a tenant request for a cloud-based computing service at the computing system. The method also includes creating an application configured to provide the requested cloud-based computing service based on the tenant request and pushing configuration data of the created application to the execution cluster to be executed at the execution cluster without further intervention from the control cluster.

20 Claims, 12 Drawing Sheets

(56) References Cited

U.S. PATENT DOCUMENTS

| | | | | |
|---|---|---|---|---|
| 2012/0124194 | A1* | 5/2012 | Shouraboura | H04L 45/122 709/224 |
| 2012/0233315 | A1* | 9/2012 | Hoffman | G06F 9/5072 709/224 |
| 2012/0260227 | A1 | 10/2012 | Shukla et al. | |
| 2012/0324069 | A1 | 12/2012 | Nori et al. | |
| 2013/0262556 | A1 | 10/2013 | Xu et al. | |
| 2013/0263209 | A1* | 10/2013 | Panuganty | H04L 43/04 726/1 |
| 2013/0332921 | A1 | 12/2013 | Khutornenko et al. | |
| 2013/0346994 | A1 | 12/2013 | Chen et al. | |
| 2014/0040656 | A1* | 2/2014 | Ho | G06F 9/5077 714/3 |
| 2014/0156847 | A1 | 6/2014 | Moscibroda et al. | |
| 2014/0298091 | A1 | 10/2014 | Carlen et al. | |
| 2015/0100684 | A1* | 4/2015 | Maes | G06F 11/3672 709/224 |

OTHER PUBLICATIONS

"International Search Report and Written Opinion Issued in PCT Application No. PCT/US2017/032303", dated Jul. 25, 2017, 11 Pages.

Fussell, et al., "Building Resilient, Scalable Services with Microsoft Azure Service Fabric", Published on: May 4, 2015, Available at: http://video.ch9.ms/sessions/ignite/2015/decks/BRK3730_Turecek.pptx.

Turecek, Vaclav, "Reliable Actors design pattern: Stateful service composition", Published on: Aug. 5, 2015, Available at: https://azure.microsoft.com/en-in/documentation/articles/service-fabric-reliable-actors-pattern-stateful-service-composition/.

"Deep Dive into Microsoft Azure Service Fabric Reliable Actors", Published on: May 7, 2015, Available at: https://www.youtube.com/watch?v=Y1ECt33j69c.

Missbach, et al., "SAP on the Cloud", In Publications of Springer, Jan. 24, 2013, 233 pages.

Stineman, Brent, "Introduction to the Azure Service Fabric", Published on: Nov. 4, 2015, Available at: https://dzone.com/articles/introduction-to-the-azure-service-fabric.

"Microsoft Azure Service Fabric Actors: The Director's Cut", Published on May 16, 2015, Available at: https://www.youtube.com/watch?v=fp8zf4uJFI0.

Kakivaya, Gopal, "Azure Service Fabric Team Blog", Published on: Jul. 23, 2015, Available at: http://blogs.msdn.com/b/azureservicefabric/archive/2015/07/23/service-fabric-a-microservices-platform.aspx.

Deichmiller, et al., "Reliable Actors design pattern: Internet of Things", Published on: Dec. 30, 2015, Available at: https://github.com/Azure/azure-content/blob/master/articles/service-fabric/service-fabric-reliable-actors-pattern-internet-of-things.md.

* cited by examiner

DISTRIBUTED OPERATIONAL CONTROL IN COMPUTING SYSTEMS

BACKGROUND

Remote or "cloud" computing typically utilizes a collection of virtual machines on remote servers, rather than local servers or personal computers, to process, manage, or store user data. A communications network can interconnect the remote servers as nodes in a "mesh" to form a computing fabric. During operation, one or more nodes of the computing fabric can cooperate with one another to provide a distributed computing environment that facilitates execution of various software applications to provide desired cloud services.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In certain computing systems, a computing fabric can include multiple clusters each having a plurality of servers. A number of servers (e.g., five servers) in each cluster can be configured as fabric controllers to monitor and manage operations of other servers in the cluster. The fabric controllers can allocate execution tasks (e.g., hosting virtual machines) in response to client requests as well as directly interact with the other servers to provision, start, stop, migrate, monitor, and manage the allocated virtual machines hosted on the other servers. The foregoing arrangement, however, can limit the number of servers in each cluster. For example, as the number of servers increases to thousands or even tens of thousands in each cluster, fabric controllers may lack computing, memory, input/output, network, storage, or other types of resources to adequately manage operations of such large number of servers.

Certain embodiments of the disclosed technology are directed to improving scalability of clusters in computing fabrics by delegating certain functions of monitoring and managing various operations of servers in the clusters from fabric controllers to the managed servers. In certain embodiments, a control cluster (e.g., a first group of servers) can receive a client request related to creation of a cloud computing service (referred to as a "tenant") that includes, for example, one or more virtual machines. In the request, the client can also provide an associated tenant description (e.g., tenant name, security settings, etc.) and service description (e.g., codes, execution configurations, and associated data) related to the requested tenant.

In response, the control cluster can communicate with an execution cluster to indicate that an application having one or more tasks is to be executed in the execution cluster to provide the requested tenant. Two or more instances of the application can be executed in different fault domains in the execution cluster, in different execution clusters, or in other suitable manners to achieve target reliability levels. In certain embodiments, the control cluster can create the application and/or tasks by implementing stateless and/or stateful actors. Each actor can include executable instructions and associated data representing state information. For example, a first actor can be configured to represent the received and stored tenant and/or service description in a network repository of the computing fabric. The first actor can also be configured to supply upon request the stored data of tenant description to other actors. For instance, a second actor can be configured to request, receive from the first actor, and process the tenant and/or service description into a tenant model having, for example, input/output interfaces, function descriptions, codes, execution containers, etc. In other embodiments, the control cluster can also create the application and/or the associated tasks utilizing monolithic applications, multi-tiered applications, or other suitable tools.

Once created, the control cluster can push configuration of the various tasks related to the requested tenant to the execution cluster as components of the application. The tasks can each include specifications of processing, memory, storage, network, or other suitable types of resources, application images, application data, or other suitable information sufficient to allow the execution cluster to execute the tasks. The tasks can also include data representing policies regarding how the individual tasks can be executed in relation to one another.

Upon activation by the control cluster, an execution controller in the execution cluster can distribute the tasks to individual nodes in the execution cluster based on processing loads, resource availability or other suitable criteria. On each node, a node service component can receive the assigned tasks and provision, execute, monitor, and manage the assigned tasks of the application locally. For example, the node service component can locally monitor a health status of an executed task and report any detected issues to the execution controller. In response to reported issues from the node, the execution controller can migrate the executed task to, for example, a different server in the execution cluster or apply other remedial measures without interventions from the control cluster.

As such, several embodiments of the disclosed technology can be highly scalable to provide distributed operational control in a computing fabric. Unlike in the computing systems described above, instead of directly interacting with servers in the execution cluster, the control cluster only creates and pushes configuration of the created application and/or tasks to the execution cluster. Provisioning, executing, monitoring, and managing the tasks can then be carried out in the execution cluster without intervention from the control cluster. The execution cluster typically have a significantly higher number of servers than the control cluster. As such, functions of operational control can be highly distributed in the execution cluster, and thus enabling ready expansion to accommodate additional servers when needed.

DETAILED DESCRIPTION

Figure 1:
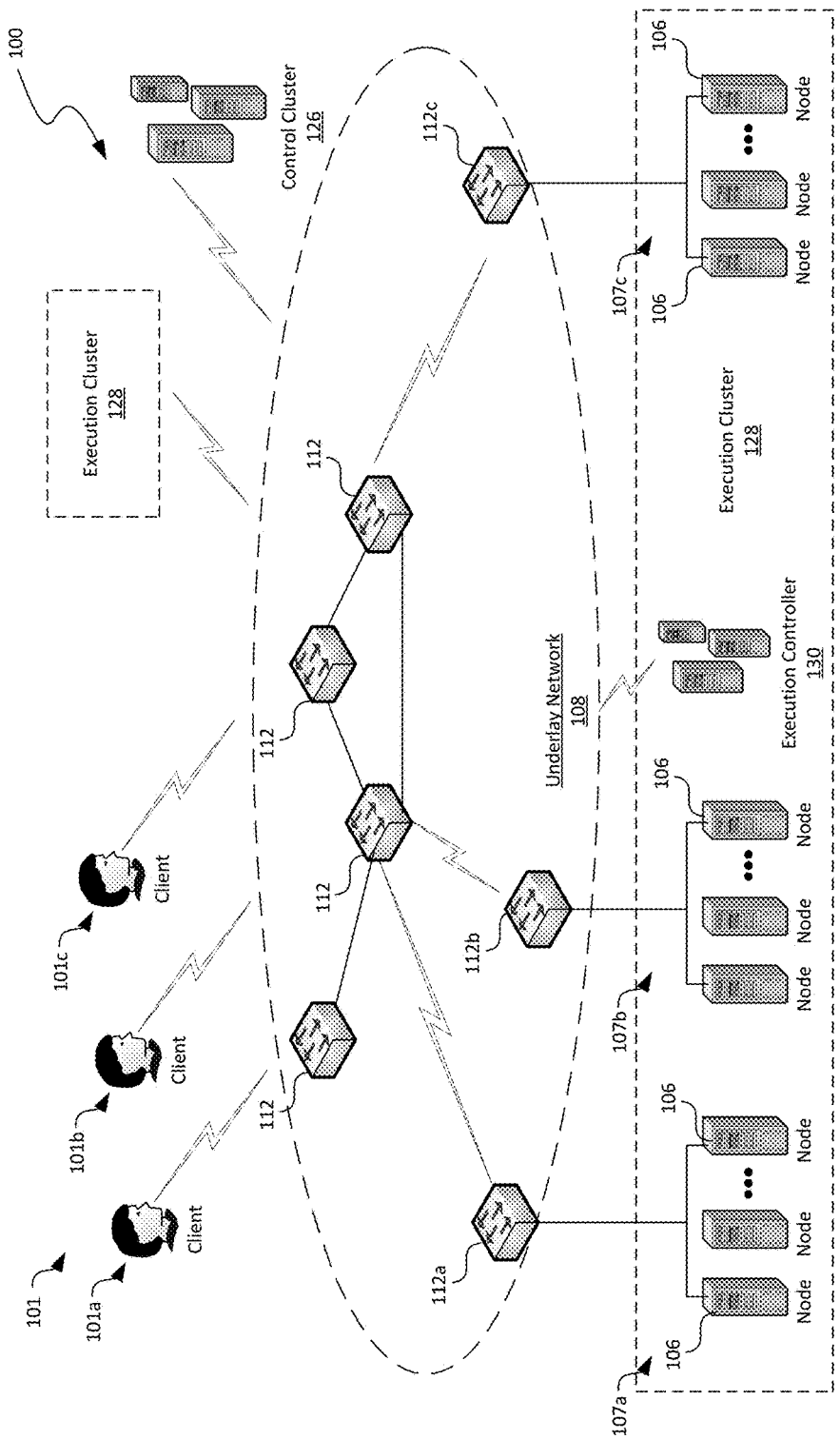
FIG. 1 is a schematic diagram illustrating a computing system configured with distributed operational control in accordance with embodiments of the disclosed technology.

Certain embodiments of computing systems, devices, components, modules, routines, and processes for implementing distributed operational control in a computing fabric are described below. In the following description, specific details of components are included to provide a thorough understanding of certain embodiments of the disclosed technology. A person skilled in the relevant art will also understand that the disclosed technology may have additional embodiments or may be practiced without several of the details of the embodiments described below with reference to FIGS. 1-6.

As used herein, the term "computing fabric" generally refers to a computer system having a plurality of network devices that interconnect a plurality of servers or nodes to one another or to external networks (e.g., the Internet). One example of a computing fabric is a cloud computing datacenter (or portions thereof) configured to provide certain cloud computing facilities. The term "network device" generally refers to a physical network component. Example network devices include routers, switches, hubs, bridges, load balancers, security gateways, or firewalls. A "node" generally refers to a physical computing device configured to implement, for instance, one or more virtual machines, virtual routers, virtual gateways, or other suitable virtualized computing components. For example, a node can include a computing server having a hypervisor configured to support one or more virtual machines.

A computing network in a computing fabric can be conceptually divided into an overlay network implemented over an underlay network. An "overlay network" generally refers to an abstracted network implemented over and operating on top of an underlay network. The underlay network can include multiple physical network devices interconnected with one another. In contrast, an overlay network can include one or more virtual networks. A "virtual network" generally refers to an abstraction of a portion of the underlay network in the overlay network. A virtual network can include one or more virtual end points referred to as "tenant sites" individually used by a client to access the virtual network and associated computing, storage, or other suitable resources. A tenant site can host one or more tenant instances, for example, virtual machines with corresponding tenant types. The virtual networks can interconnect multiple tenant instances on different nodes of the computing fabric. Virtual network devices in the overlay network can be connected to one another by virtual links individually corresponding to one or more network routes along one or more physical network devices in the underlay network.

Also used herein, the term "actor" generally refers to an isolated, independent unit of computation and state with single-threaded execution. Actors can be executed simultaneously and independently in concurrent or distributed systems. Actors can communicate with each other and can create additional actors. For example, actors can interact with an operating system or with other actors by exchanging asynchronous messages using, for instance, a request-response pattern.

As used herein, the term "application" generally refers to a collection of constituent services or tasks that are individually configured to perform certain function(s) and can be executed in a distributed cloud computing fabric. A "service" or "task" generally refers to a software component configured to be executed to perform a desired function independently of other services or tasks in the same application. In certain embodiments, a service or task can include computer executable instructions, runtime configurations, and/or suitable data. In other embodiments, a service or task can also include execution policies, performance parameters, type, version, and/or other suitable information.

In addition, as used herein, the term "control cluster" generally refers to a computing system configured to create applications executable by an execution cluster based on tenant requests received from clients. The term "execution cluster" generally refers to a computing system configured to execute the created applications and provide results of the requested tenant to clients. Both the control cluster and the execution cluster can include one or more virtual machines and/or physical servers interconnected with one another. In certain embodiments, a control cluster can be separated from an associated execution cluster. In other embodiments, a control cluster can be co-located with the associated execution cluster.

In some computing systems, certain servers in a computing fabric can be configured as fabric controllers to monitor and manage operations of other servers. The fabric controllers can allocate execution tasks (e.g., hosting virtual machines) as well as directly interact with the other servers to provision, start, stop, migrate, or otherwise monitor and manage the allocated virtual machines hosted on the other servers. Such an arrangement, however, can limit the number of servers in a cluster. For example, as the number of servers increases to thousands or even tens of thousands, fabric controllers may quickly deplete available resources to adequately manage operations of such large number of servers.

Several embodiments of the disclosed technology can improve scalability in a computing fabric by converting tenant requests into certain applications for execution in an execution cluster having a large number of nodes. As such, certain functions of conventional fabric controllers can be delegated to nodes in the execution cluster. For example, the execution cluster can provision, execute, monitor, or otherwise manage operations of the servers in the execution cluster. Thus, unlike in conventional computing systems, the control cluster does not directly interact with nodes in the execution cluster to manage various operations of the nodes. As a result, the execution cluster can be more readily scaled than conventional computing systems, as described in more detail below with reference to FIGS. 1-6.

FIG. 1 is a schematic diagram illustrating a computing system 100 configured for distributed operational control in accordance with embodiments of the disclosed technology. As shown in FIG. 1, the computing system 100 can include an underlay network 108 interconnecting a plurality of clients 101, a control cluster 126, and one or more execution clusters 128 forming a computing fabric. Two execution clusters 128 are shown for illustration purposes though the computing system 100 can include any suitable number of execution clusters 128. Also, FIG. 1 shows details of only one execution cluster 128 for clarity. The other execution cluster 128 can have generally similar or different configurations than the one shown with details. Even though particular components of the computing system 100 are shown in FIG. 1, in other embodiments, the computing system 100 can also include additional and/or different components. For example, in certain embodiments, the computing system 100 can include network storage devices, utility infrastructures, and/or other suitable components (not shown).

As shown in FIG. 1, the underlay network 108 can include one or more network devices 112 that interconnect the clients 101, the control cluster 126, and the execution cluster 128. The underlay network 108 can include multiple network devices 112 operatively coupled to one another to interconnect the control cluster 126 and the execution cluster 128 into a computing fabric. Examples of the network devices 112 can include routers, switches, firewalls, load balancers, or other suitable network components. Even though particular connection scheme is shown in FIG. 1 for illustration purposes, in other embodiments, the network devices 112 can be operatively coupled in a hierarchical, flat, "mesh," or other suitable topologies.

The execution cluster 128 can include a plurality of nodes 106 and an execution controller 130 operatively coupled to one another via the underlay network 108. In certain embodiments, the nodes 106 can individually include a processor, a physical server, or several physical servers. In other embodiments, the nodes 106 can also include a virtual server or several virtual servers. The nodes 106 can be organized into racks, availability zones, groups, sets, or other suitable divisions. For example, in the illustrated embodiment, the nodes 106 are grouped into three racks identified individually as first, second, and third racks 107a-107c, which are operatively coupled to corresponding network devices 112a-112c. The network devices 112a-112c can then be operatively coupled to additional network devices 112 to form a computer network that allows communication between nodes 106 and the execution controller 130. In certain embodiments, each of the racks 107a-107c with corresponding network devices 112a-112c can form a distinct fault domain. In other embodiments, multiple racks 107a-107c may share a single network device 112, or can have other suitable topologies.

The nodes 106 can individually be configured to provide computing, storage, and/or other suitable cloud computing facilities to the tenants 101. For example, as described in more detail below with reference to FIG. 2, one of the nodes 106 can include components that initiate and maintain one or more virtual machines 144 (shown in FIG. 2). The clients 101 can then utilize the initiated virtual machines 144 to perform computation, communications, content distribution, and/or other suitable operations. In certain embodiments, one of the nodes 106 can host virtual machines 144 for multiple clients 101. For example, one of the nodes 106 can host three virtual machines 144 individually corresponding to each of the clients 101a-101b.

The execution controller 130 can be configured to monitor and manage operations of the nodes 106 in the execution cluster 128. For example, in certain embodiments, the execution controller 130 can be configured to distribute applications and/or services to be deployed at various nodes 106. The execution controller 130 can also monitor execution of the applications and/or services, health status of the nodes, or other operational parameters. In the event of detecting operational issues, the execution controller 130 can be configured to perform failover and provide consistent routing of message among the nodes 106. Example control systems suitable for the execution controller 130 can include Amazon Web Service controller provided by Amazon.com of Seattle, Wash. or Azure fabric controller provided by Microsoft Corporation of Redmond, Wash. Certain components of embodiments of the execution controller 130 are described below in more detail with reference to FIGS. 3A-3E.

The control cluster 126 can be configured to receive tenant requests from the clients 101 and create applications and services to be executed by the execution cluster 128 based thereon. In certain embodiments, the control cluster 126 can allocate execution of the created applications to one or more of the nodes 106 in the execution cluster 128 directly. In other embodiments, the control cluster 126 can allow the execution controller 130 to allocate deployment of the created applications and/or services. In further embodiments, the control cluster 126 can allocate the created applications to other execution clusters (not shown), for example, in a different datacenter instead of the execution cluster 128. Example components and operations of the control cluster 126 are described in more detail below with reference to FIGS. 3A-3E.

In operation, one or more of the clients 101 can transmit tenant requests to the control cluster 126 via the underlay network 108. The tenant requests can include suitable hosted cloud facilities such as hosted virtual machines, web services, and/or other suitable facilities. In response, the control cluster 126 can create one or more applications and associated services to be executed by the execution cluster 128 to provide instances of the requested tenant. The applications can individually include one or more services which can individually include computer executable instructions, runtime configurations, and/or suitable data. The control cluster 126 can then push configuration of the applications and/or services to the execution cluster 128.

In response to receiving the configuration of the applications and/or services from the control cluster 126, the execution controller 130 in the execution cluster 128 can allocate the individual applications and/or services to one or more of the nodes 106 in the execution cluster 128. At each node 106, in response to the received applications and/or services, the node 106 can manage lifecycles of instances of the applications and/or services without further intervention from the control cluster 126. For example, the node 106 can provision, start, stop, migrate, or otherwise manage one or more tenant containers such as virtual machines 144 on the node 106. As used herein, a "tenant container" generally refers to an software container configured to execute an application or service to provide an instance of a requested tenant or a part thereof. Example tenant containers can include virtual machines, Docker containers, or other suitable software components. During operation, the node 106 can also report operational parameters or issues to the execution controller 130. In the event of a detected failure or issue in one of the nodes 106, the execution controller 130 can cause a hosted virtual machine 144 to be migrated to another node 106 in the execution cluster 128.

As such, unlike in conventional computing systems, the control cluster 126 does not directly interact with the nodes 106 in the execution cluster 128 to provision, monitor, or manage various operations of the nodes 106. Instead, the control cluster 126 delegates such functions to the execution controller 130 or the nodes 106. Thus, the control cluster 126 can accommodate a significantly higher number of nodes 106 in the execution cluster 128 than in conventional computing systems.

Figure 2:
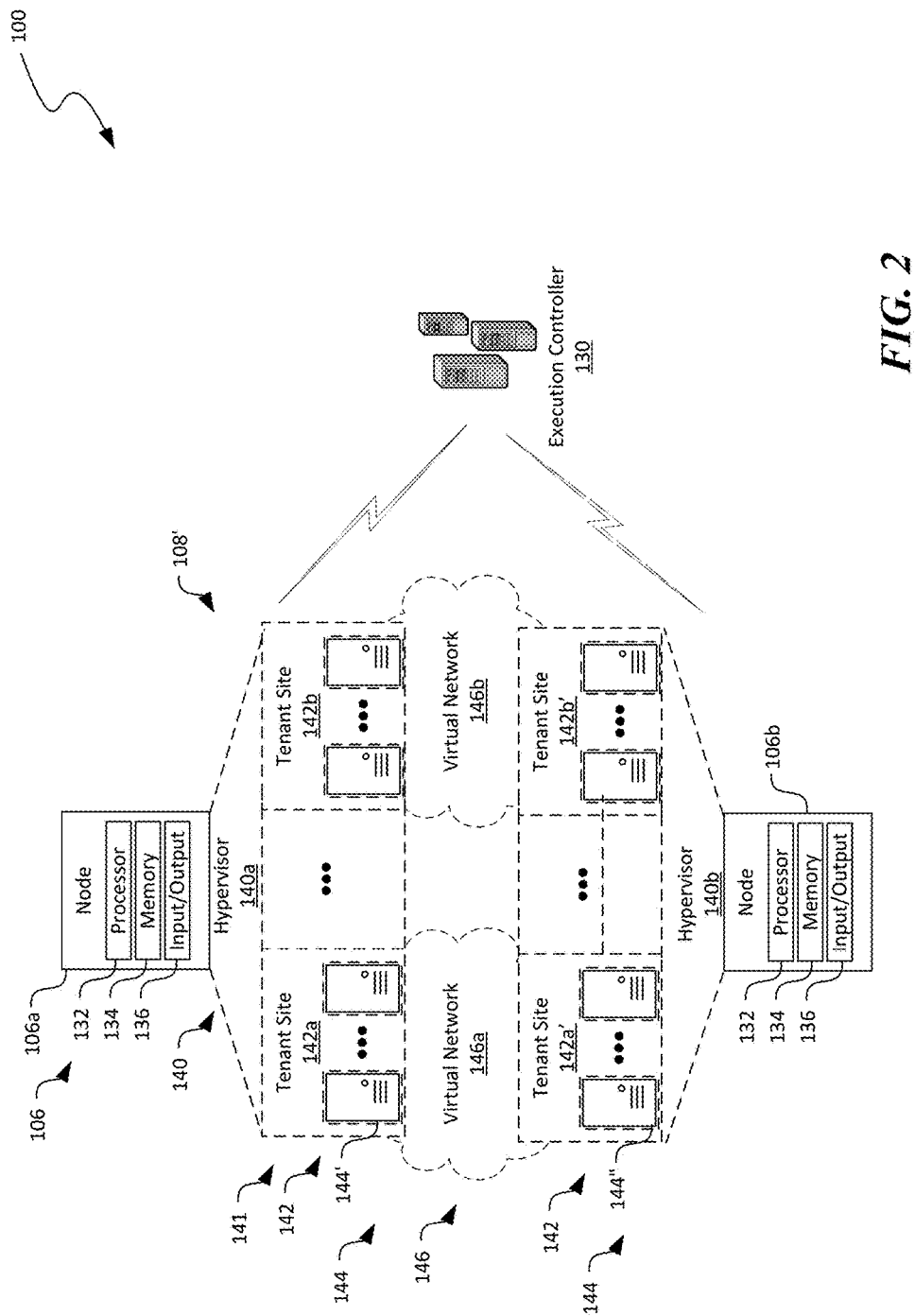
FIG. 2 is a schematic diagram illustrating certain hardware/software components of the computing system of FIG. 1 in accordance with embodiments of the disclosed technology.

FIG. 2 is a schematic diagram illustrating an example overlay network 108' implemented on the underlay network 108 of FIG. 1 in accordance with embodiments of the disclosed technology. In FIG. 2, only certain components of the underlay network 108 of FIG. 1 are shown for clarity. As shown in FIG. 2, the first node 106a and the second node 106b can each include a processor 132, a memory 134, and an input/output component 136 operatively coupled to one another. The processor 132 can include a microprocessor, a field-programmable gate array, and/or other suitable logic devices. The memory 134 can include volatile and/or non-volatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIG. 5). The input/output component 136 can include a display, a touch screen, a keyboard, a mouse, a printer, and/or other suitable types of input/output devices configured to accept input from and provide output to an operator and/or an automated software controller (not shown).

The memory 134 of the first and second nodes 106a and 106b can include instructions executable by the processors 132 to cause the individual processors 132 to provide a hypervisor 140 (identified individually as first and second hypervisors 140a and 140b) and other suitable components (not shown). The hypervisors 140 can individually be configured to initiate, monitor, terminate, and/or otherwise locally manage one or more virtual machines 144 organized into tenant sites 142. For example, as shown in FIG. 2, the first node 106a can provide a first hypervisor 140a that manages first and second tenant sites 142a and 142b, respectively. The second node 106b can provide a second hypervisor 140b that manages first and second tenant sites 142a' and 142b', respectively. The hypervisors 140 can be software, firmware, or hardware components. The tenant sites 142 can each include multiple virtual machines 144 or other suitable tenant instances for a particular tenant (not shown). For example, the first node 106a and the second node 106b can both host the tenant site 142a and 142a' for a first tenant 101a (FIG. 1). The first node 106a and the second node 106b can both host the tenant site 142b and 142b' for a second tenant 101b (FIG. 1). Each virtual machine 144 can be executing a corresponding operating system, middleware, and/or applications.

Also shown in FIG. 2, the computing system 100 can include an overlay network 108' having one or more virtual networks 146 that interconnect the tenant sites 142a and 142b across multiple hosts 106. For example, a first virtual network 142a interconnects the first tenant sites 142a and 142a' at the first node 106a and the second node 106b. A second virtual network 146b interconnects the second tenant sites 142b and 142b' at the first node 106a and the second node 106b. Even though a single virtual network 146 is shown as corresponding to one tenant site 142, in other embodiments, multiple virtual networks 146 (not shown) may be configured to correspond to a single tenant site 146.

The virtual machines 144 on the virtual networks 146 can communicate with one another via the underlay network 108 (FIG. 1) even though the virtual machines 144 are located on different hosts 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machine 144 in a particular virtual network 146. Thus, different virtual networks 146 can use one or more virtual network addresses that are the same. Example virtual network addresses can include IP addresses, MAC addresses, and/or other suitable addresses.

FIGS. 3A-3E are block diagrams illustrating certain hardware/software components of the computing system 100 of FIG. 1 during certain stages of operation in accordance with embodiments of the disclosed technology. In FIGS. 3A-3E and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). In certain embodiments, the various components and modules described below can be implemented with actors. In other embodiments, generation of the application and/or related services can also be implemented using monolithic applications, multi-tiered applications, or other suitable components.

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

Figure 3A:
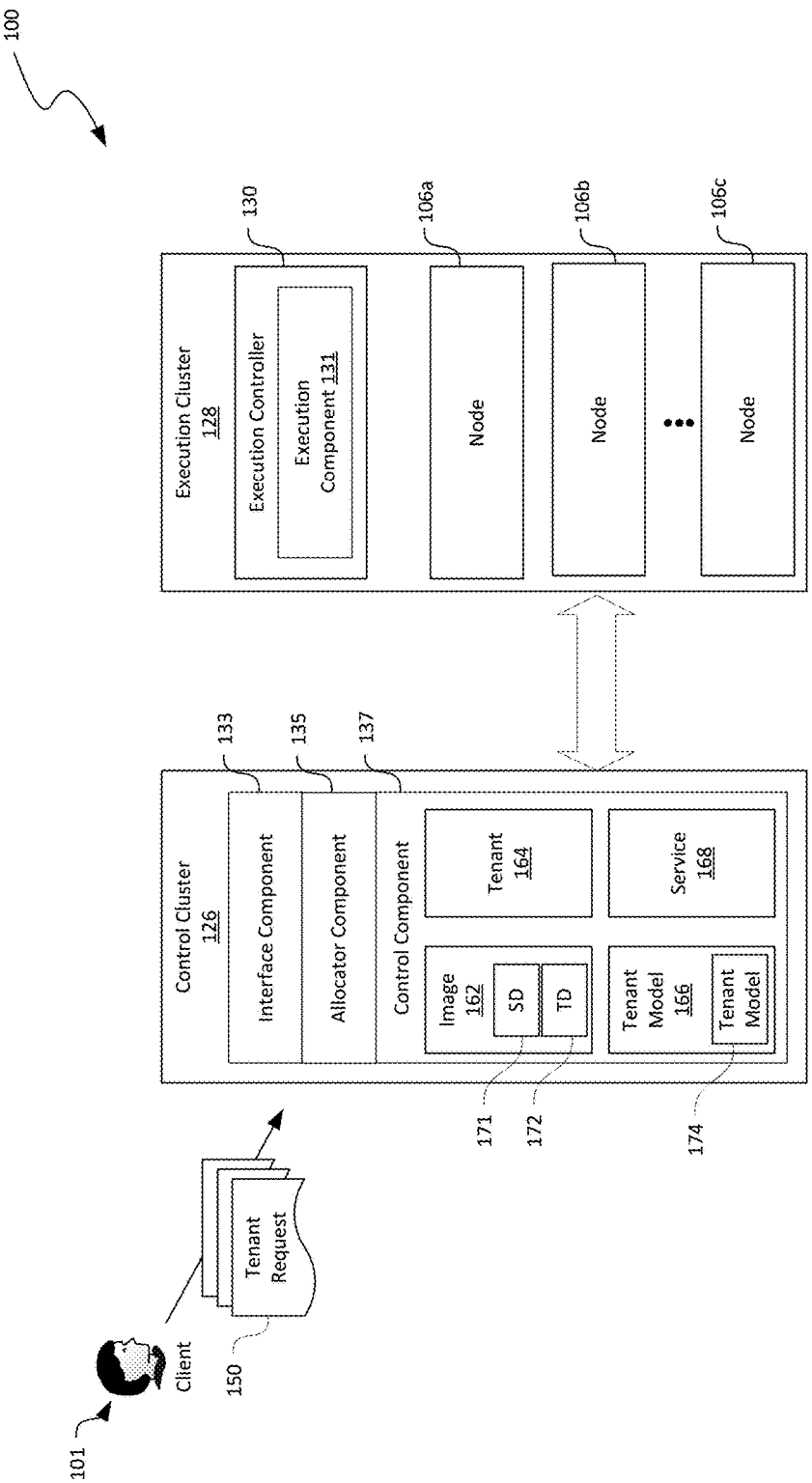
FIGS. 3A-3E are block diagrams illustrating certain hardware/software components of the computing system of FIG. 1 during certain stages of operation in accordance with embodiments of the disclosed technology.

As shown in FIG. 3A, the control cluster 126 can include an interface component 133, an allocator component 135, and a control component 137 operatively coupled to one another. As described above, the control cluster 126 can include one or more physical or virtual servers interconnected with one another. As such, in certain embodiments, instances of the illustrated components of the control cluster 126 can be located on a single physical or virtual server. In other embodiments, instances of the foregoing components can be distributed on a plurality of physical or virtual servers. In further embodiments, duplicate instances of at least some of the foregoing components can also be distributed on a plurality of physical or virtual servers to provide, for example, target availability.

The interface component 126 can be configured to receive a request description 150 as a user input from the client 101.

In certain embodiments, the request description 150 can include a tenant description and a service description. The tenant description can include data representing a tenant name, security settings, web application indication, and other suitable information. The service description can include, for example, program codes, configurations, and associated data related to the requested tenant.

The interface component 126 can then be configured to convey the received request description 150 to the allocator component 135 and the control component 137 for further processing. In certain embodiments in which multiple instances of the allocator component 135 or control component 137 are available, the interface component 126 can include a stateless distributor that selects a particular instance of the foregoing components for further processing the received request description 150. In other embodiments, the interface component 133 can also include other suitable components for conveying or transmitting the received request description 150 to the other components of the control cluster 126.

In certain embodiments, the allocator component 135 can be configured to allocate certain operations in response to the user input to one of the execution clusters based on location of the client 101, types of the operations, availability of the execution clusters, or other suitable information. In FIGS. 3A-3E, only one selected execution cluster 128 is shown. In other embodiments, the allocator component 135 can allocate duplicates of the same operations to multiple execution clusters 128 in the computing system 100. In further embodiments, the allocator component 135 can also be configured to allocate the operations to particular nodes 106 in the execution cluster 128.

The control component 137 can be configured to generate an application based on the received request description 150 from the interface component 133 to be executed in the execution cluster 128. As shown in FIG. 3A, the control component 137 can include an image module 162, a tenant module 164, a tenant model module 166, and a service module 168. The image module 162 can be configured to store the received request description 150 as records of a service description actor 171 (shown in FIG. 3A as SD 171) and a tenant description actor 172 (shown in FIG. 3A as TD 172) in an image repository (not shown) of the control cluster 126. Image module 162 can also be configured to supply the stored service and tenant descriptions 171 and 172 to other modules upon request via, for example, an API or other suitable interface.

The tenant model module 166 can be configured to create a tenant model 174 based on the service description 171 and the tenant description 172 received from the image module 162. In certain embodiments, the tenant model 174 can include specifications of input/output interfaces, configuration information such as settings, overrides, and communication channels, computer executable codes that can be executed, container information such as virtual machines, and other suitable information.

Figure 3B:
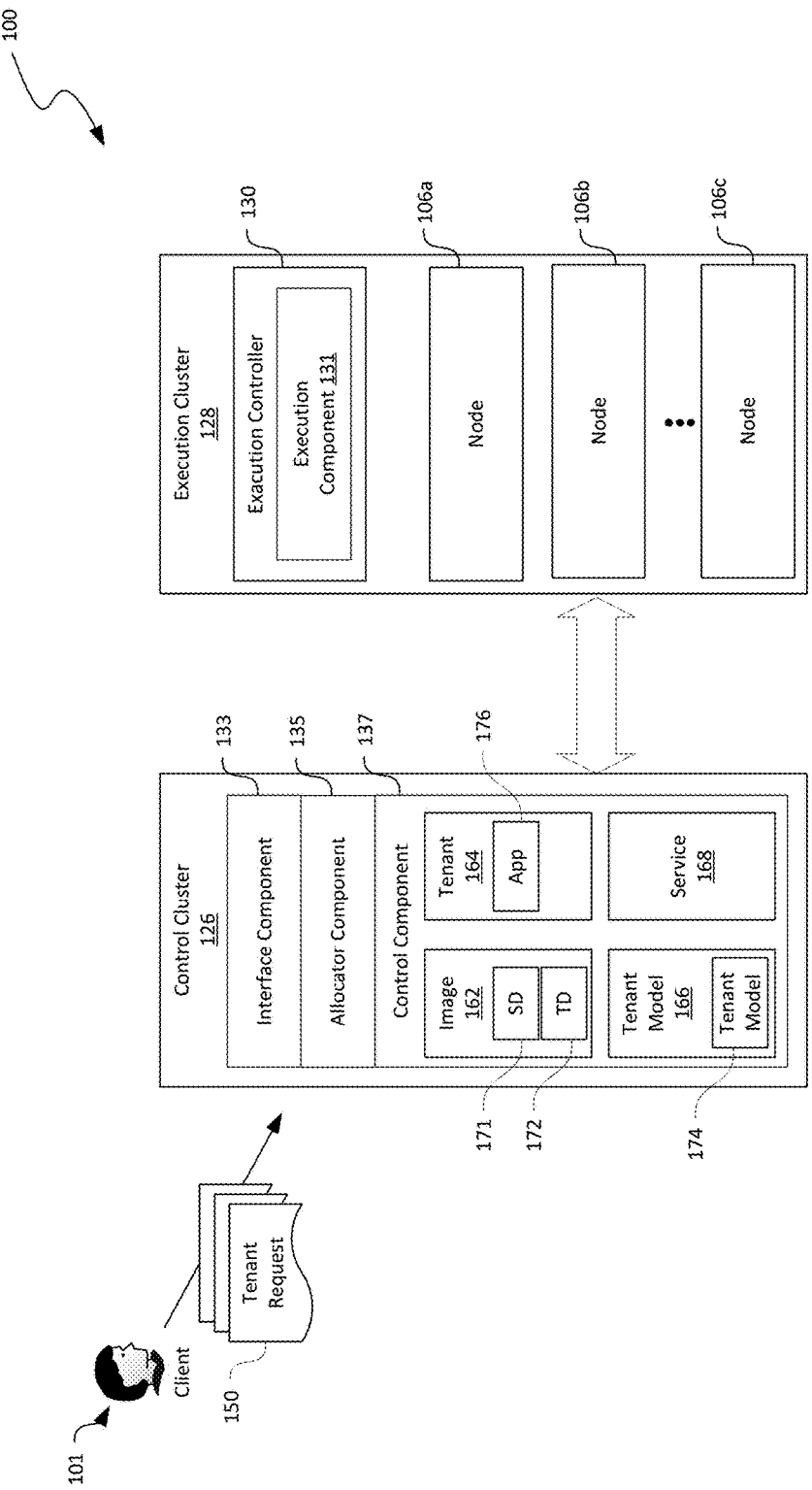
Figure 3C:
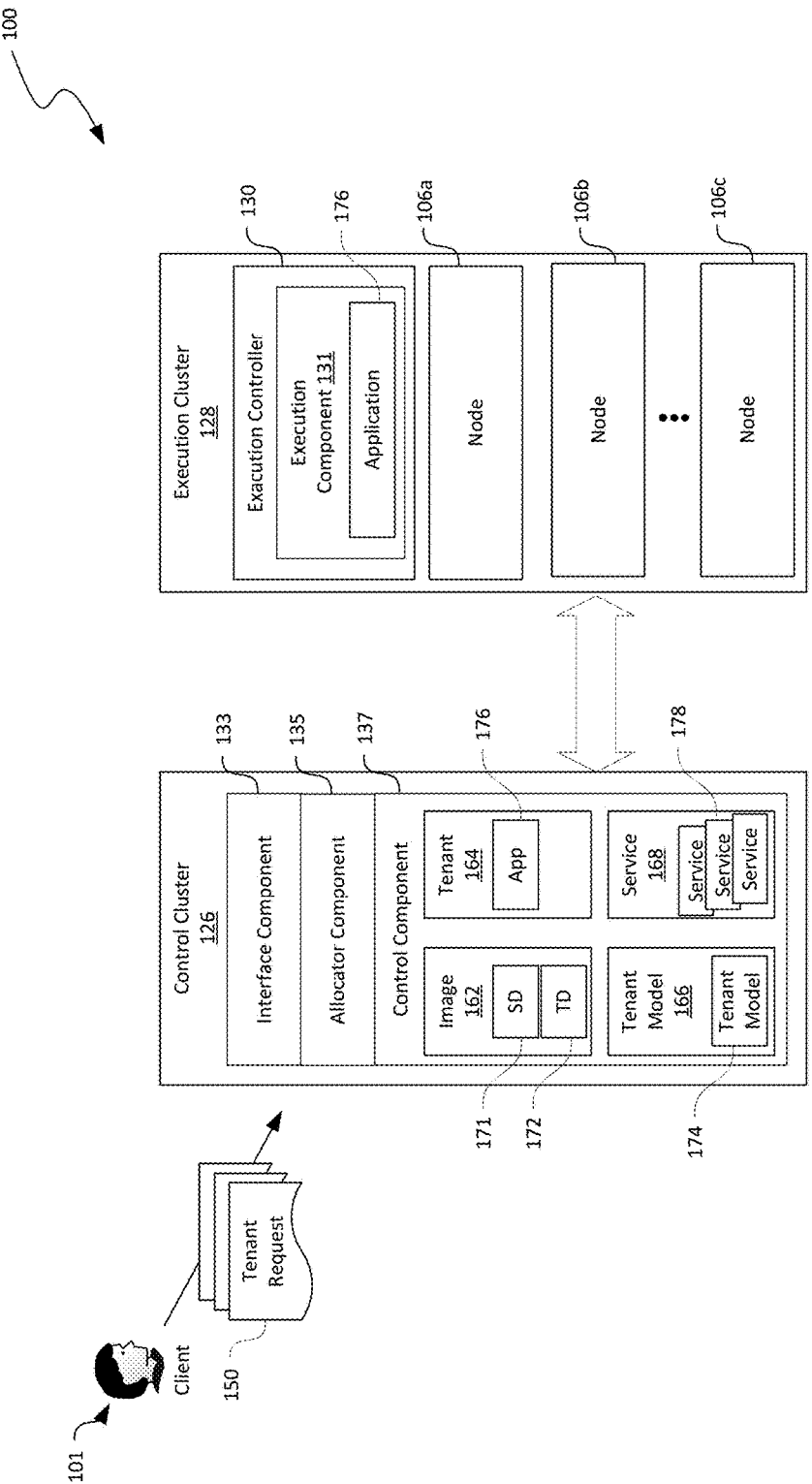

As shown in FIG. 3B, based on the tenant model 174, the tenant module 164 can create an application 176 (shown in FIG. 3A as app 176) that corresponds to the received request description and can be executed in the execution cluster 128. The created application 176 can include one or more services as constituents of the application 176. For example, as shown in FIG. 3C, the service module 168 can create multiple services 178 associated with the application 176. In the illustrated embodiment, three services 178 are shown for illustration purposes. In other embodiments, the service module 168 can be configured to create any suitable number of services 178.

Also shown in FIG. 3C, the execution controller 130 can include an execution component 131 that monitor and manage operations of the nodes 106 (shown as nodes 106a-106c). For example, in certain embodiments, the control cluster 126 can indicate to the execution controller 130 that execution of an instance of the application 176 is assigned to the execution cluster 128. In response, the execution component 131 can create a placeholder for the application 176 and wait for further information related to the application 176.

Figure 3D:
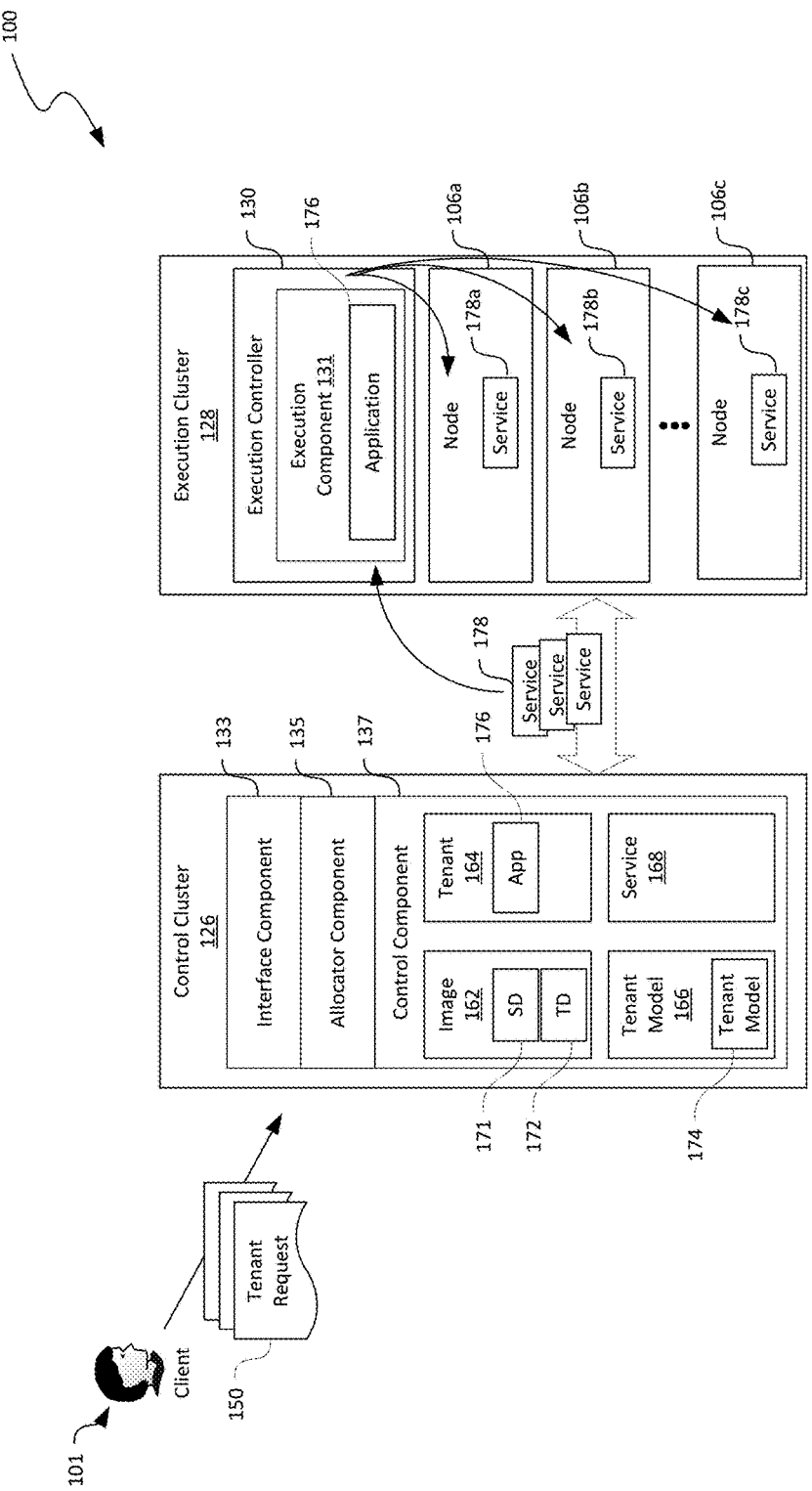

As shown in FIG. 3D, the control cluster 126 can transmit the created services 178 to the execution controller 130 for execution. In response, the execution component 131 can be configured to distribute the services 178 to various nodes 106 in the execution cluster 128 based on processing loads, resource types, or other suitable criteria. For example, in the illustrated embodiment, services 178a-178c are distributed to nodes 106a-106b, respectively. In other embodiments, the services 178 can be allocated in other suitable manners.

Figure 3E:
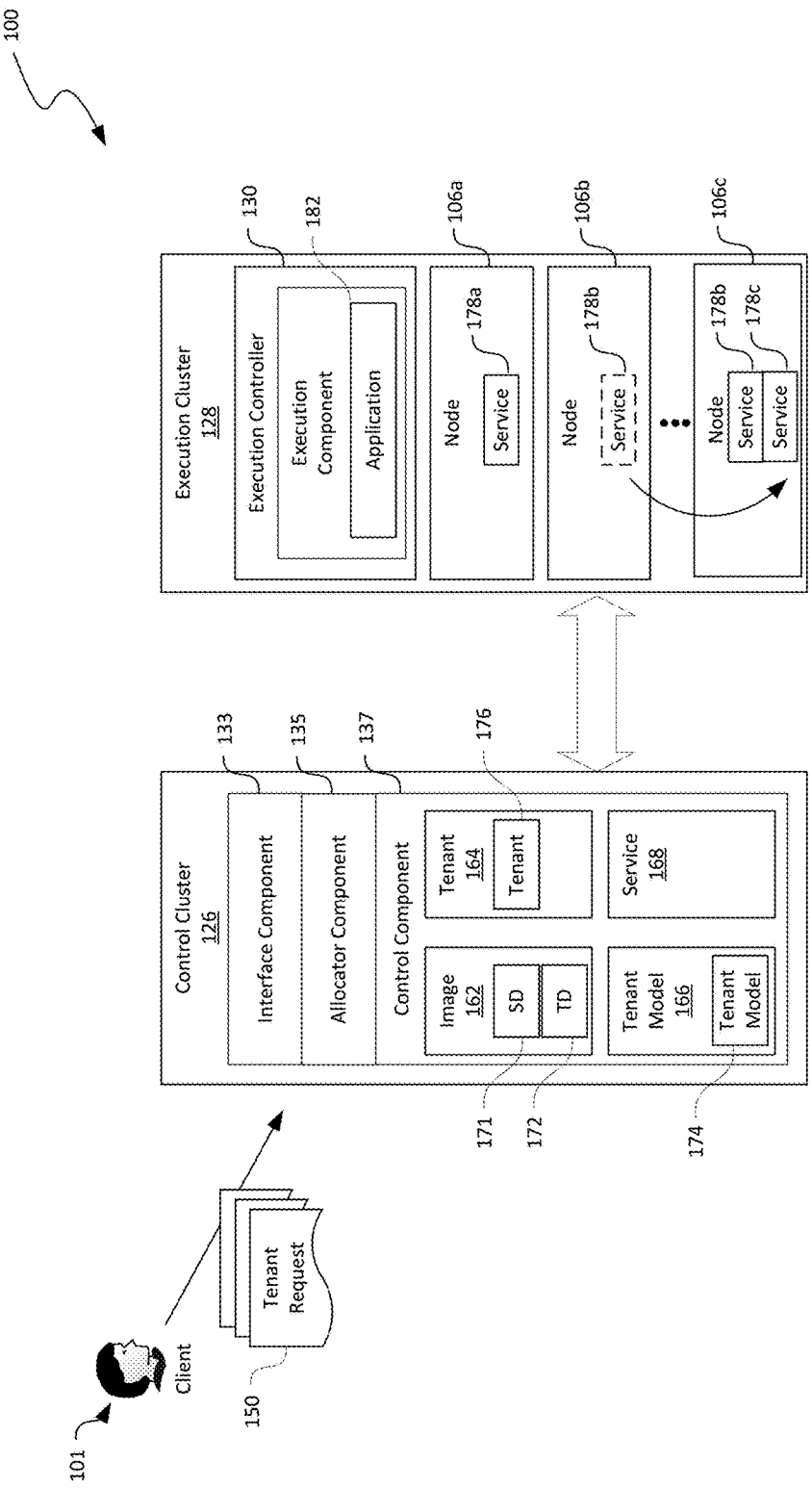

Upon receiving the allocated services 178a-178c, the individual nodes 106a-106c can interact with the allocated services 178a-178c, for example, with the hypervisor 107 (FIG. 2), to provision, initiate, and monitor execution of the services 178a-178c to launch and manage tenant containers (e.g., virtual machines). During operation, the nodes 106a-106c can monitor the execution parameters and conditions of the executed services 178a-178c. The nodes 106a-106c can report any monitored execution parameters and conditions to the execution controller 130. In the event of an execution issue, the execution controller 130 can migrate or apply other remedial measures. For example, as shown in FIG. 3E, in the event that node 106b reports a node failure or other issues, the execution controller 130 can cause the service 178b be migrated to the node 106c for continued execution.

Figure 4A:
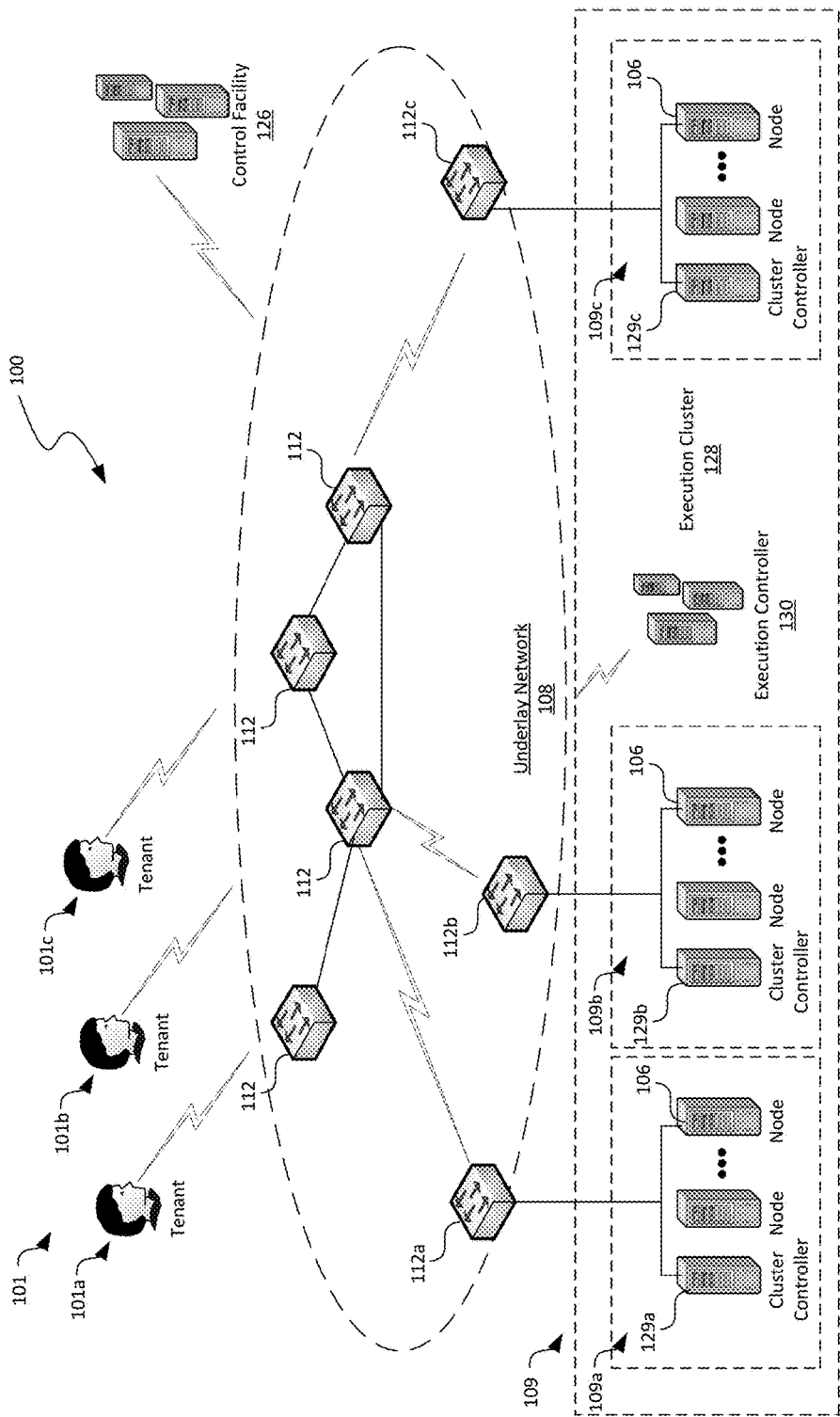
FIG. 4A is a schematic diagram illustrating another computing system configured with distributed operational control in accordance with embodiments of the disclosed technology.
Figure 4B:
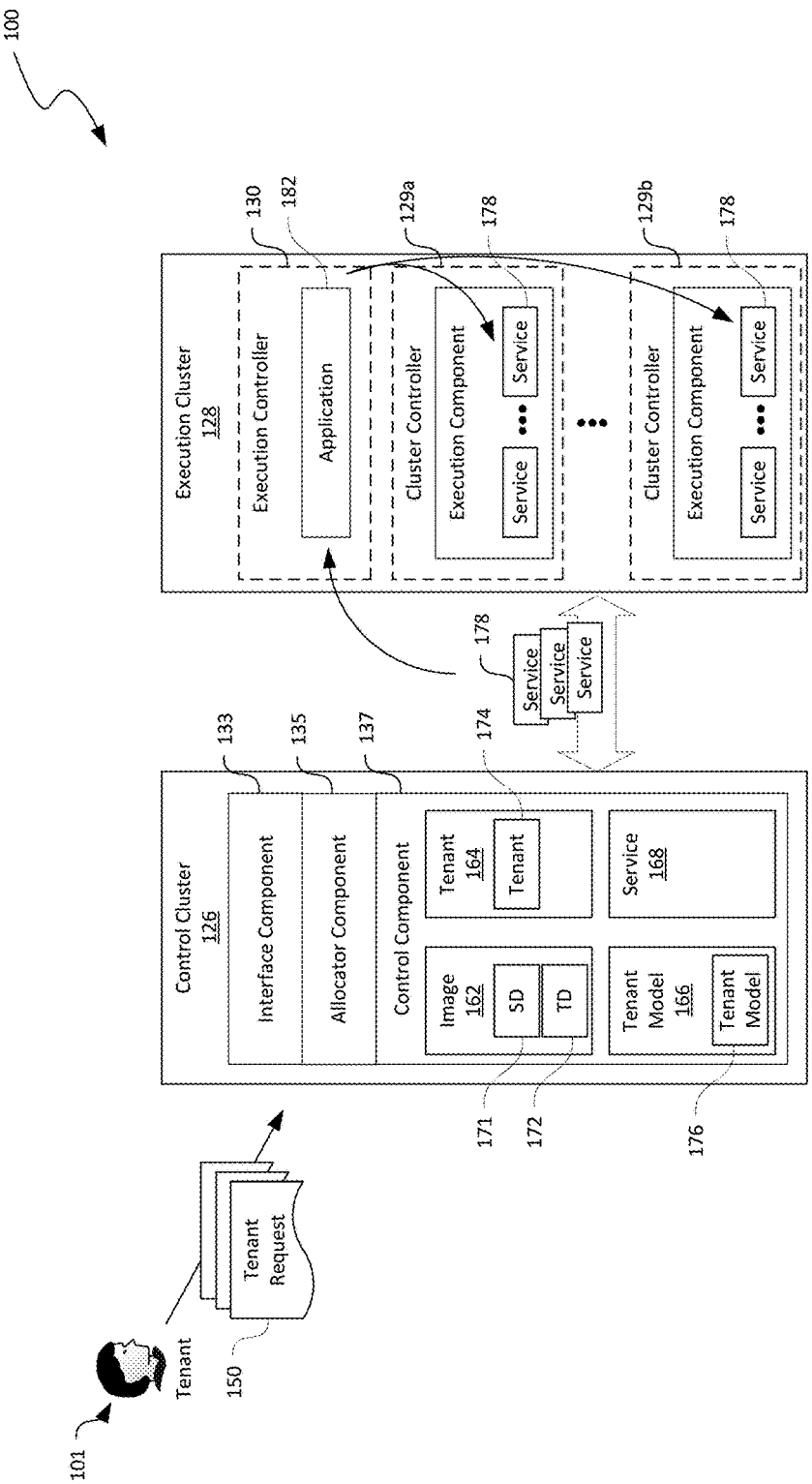
FIG. 4B is a block diagram illustration certain hardware/software components of the computing system of FIG. 4A during certain stage of operation in accordance with embodiments of the disclosed technology.

Even though the execution cluster 128 is shown in FIG. 1 as having a flat topology, in other embodiments, the execution cluster 128 can have additional hierarchies. For example, as shown in FIG. 4A, the execution cluster 128 can include multiple subordinate clusters 109 each with a cluster controller 129 (shown as cluster controllers 129a-129c). In operation, as shown in FIG. 4B, the execution controller 130 can allocate the application 174 and/or the services 178 to select subordinate clusters 109. In turn, an execution component 131 in each cluster controller 129 of the subordinate clusters 109 can assign the allocated services 178 to individual nodes 106 in the subordinate clusters based on processing load, resource types, or other suitable criteria.

Figure 5A:
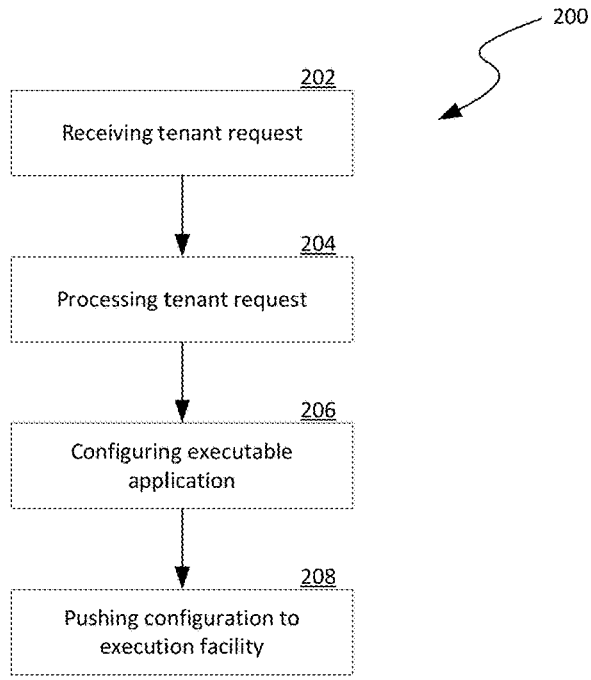
FIGS. 5A-5C are flowcharts illustrating various processes of distributed operational control in accordance with embodiments of the disclosed technology.

FIG. 5A is a flowchart illustrating a process 200 of distributed operational control in accordance with embodiments of the disclosed technology. In certain embodiments, the process 200 can be implemented in the control cluster 126 of the computing system 100 of FIG. 1 for creating new tenants, deleting existing tenants, or updating/modifying existing tenants. In other embodiments, the process 200 can also be implemented in other computing systems with similar or different components and/or configurations for other suitable functions.

As shown in FIG. 5A, the process 200 can include receiving a tenant request for a cloud-based computing service from a client at stage 202. As discussed above with reference to FIG. 1, the tenant request can include a service description, a tenant description, or other suitable information. The process 200 can then include processing the received tenant request at stage 204. In certain embodiments, processing the received tenant request can include storing the received service description, tenant description, or other suitable information in an image repository in a computing fabric. In other embodiments, processing the received tenant request can also include generating a tenant model based on the received service description, tenant description, or other suitable information.

The process 200 can then include configuring an executable application for the requested tenant based on, for example, the tenant model at stage 206. In certain embodiments, the executable application can include one or more services, as described above with reference to FIG. 1. In other embodiments, the executable application can also include data representing execution policies regarding the one or more services. For example, the execution policies can specify that two different services cannot be executed on a single fault domain, need to be executed in succession, or in other suitable manners. The process 200 can then include pushing configuration of the executable application and associated services to an execution cluster to be executed.

Figure 5B:
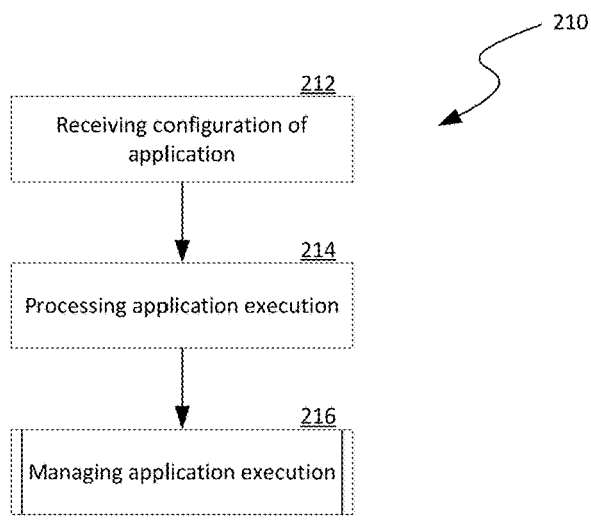

FIG. 5B is a flowchart illustrating a process 210 of executing cloud-based applications in accordance with embodiments of the disclosed technology. As shown in FIG. 5B, the process 210 can include receiving configuration of an executable application at stage 212. The process 210 can also include processing the application for execution at stage 214. In certain embodiments, the application can include multiple services. Thus, processing the application can include allocating the various services to one or more nodes for execution based on, for example, execution policies associated with the services. Processing the application can also include provisioning, initiating, or stopping the various allocated services, for example, at the individual nodes.

Figure 5C:
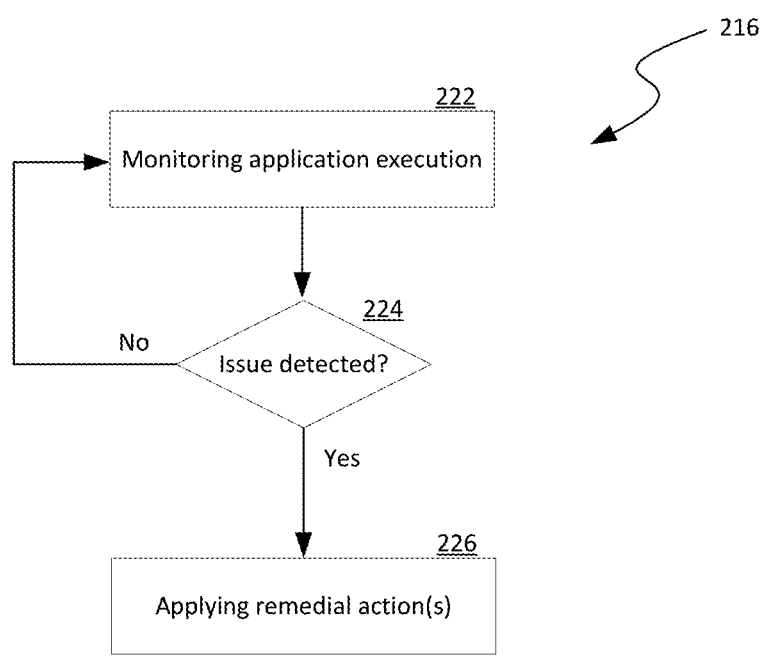

The process 210 can also include locally managing application execution at stage 216. For example, as shown in FIG. 5C, managing application execution can include monitoring application execution at stage 222. The process 216 can then include a decision stage to determine whether an issue is detected, for example, a node failure. In response to determining that an issue is detected, the process 216 can include applying remedial actions such as migrating execution of a service to another node, restarting the node, or other suitable measures. In response to determining that an issue is not detected, the process 216 reverts to monitoring application execution at stage 222.

Figure 6:
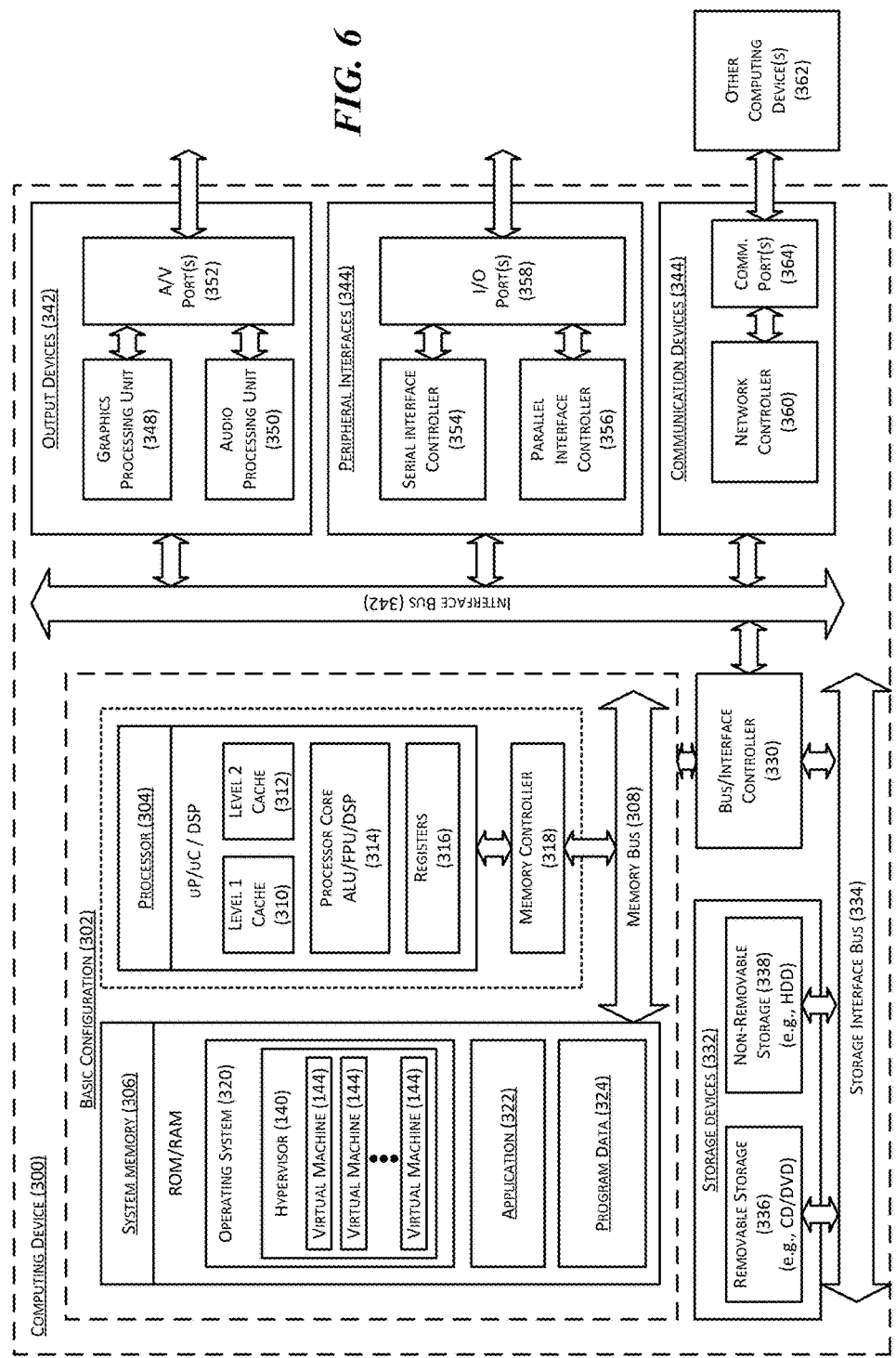
FIG. 6 is a computing device suitable for certain components of the computing system in FIGS. 1 and 4A.

FIG. 6 is a computing device 300 suitable for certain components of the computing system 100 in FIG. 1. For example, the computing device 300 can be suitable for the nodes 106 in the execution cluster 128 or nodes in the control cluster 126 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (μP), a microcontroller (μC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 6, the operating system 320 can include a hypervisor 140 for managing one or more virtual machines 144. This described basic configuration 302 is illustrated in FIG. 6 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method for distributed operational control in a computing system configured to provide cloud computing services, the computing system having a control cluster and an execution cluster, the method comprising:
   receiving, at the control cluster, a tenant request for a cloud-based computing service at the computing system;
   generating, at the control cluster, a tenant model associated with the requested cloud-based computing service based on the received tenant request, the tenant model including at least one of input/output interfaces, function descriptions, codes, or execution containers corresponding to the requested cloud-based computing service;
   creating, at the control cluster, an application configured to provide the requested cloud-based computing service based on the tenant model, the application including one or more services individually including computer executable instructions, runtime configurations, and data; and
   pushing, from the control cluster, configuration data of the created application to the execution cluster to be executed at the execution cluster to provide the client requested cloud-based computing service, wherein the one or more services of the created application are provisioned, executed, and managed in the execution cluster according to the pushed configuration data of the created application from the control cluster without further interaction with the control cluster.

2. The method of claim 1 wherein:
   the tenant request includes a service description and a tenant description;
   the service description includes codes, execution configurations, and associated data;
   the tenant description includes a tenant name and security settings; and
   generating the tenant model includes generating the tenant model based on the service description and the tenant description.

3. The method of claim 1, further comprising instructing the execution cluster to initiate an instance of the created application based on the pushed configuration data of the created application.

4. The method of claim 1, further comprising instructing the execution cluster to initiate an instance of the created application based on the pushed configuration data of the created application and delegating execution control of the instance of the created application to the execution cluster.

5. The method of claim 1, further comprising instructing the execution cluster to initiate an instance of the created application based on the pushed configuration data of the created application and delegating at least one of provisioning, starting, or stopping the instance of the created application to the execution cluster.

6. The method of claim 1 wherein:
   the execution cluster is a first execution cluster;
   the computing system further includes a second execution cluster; and
   the method further includes instructing the first and second execution cluster to each initiate an instance of the created application based on the pushed configuration data of the created application.

7. The method of claim 1 wherein creating the application includes creating a plurality of services individually including computer executable instructions, runtime configurations, data, and execution policies to be followed by the execution cluster during execution, the execution policies of one service being relative to other services of the created application.

8. The method of claim 1 wherein creating the application includes creating a plurality of services individually including computer executable instructions, runtime configurations, data, and execution policies to be followed by the execution cluster during execution, wherein the execution policies of one service indicates that the service is to be executed on a different node in the execution cluster than another one of the services.

9. A computing device in a computing system having an execution cluster with a plurality of nodes, the computing device comprising:
   a processor; and
   a memory including instructions executable by the processor to cause the processor to perform a process including:
      receiving a tenant request for a cloud-based computing service at the computing system;
      generating, at the computing device, a tenant model associated with the requested cloud-based computing service based on the received tenant request, the tenant model including at least one of input/output interfaces, function descriptions, codes, or execution containers;
      based on the tenant model, at the computing device, configuring an application for execution by the execution cluster, the application including one or more services individually including computer executable instructions, runtime configurations, and data; and instructing, from the computing device, the execution cluster to execute an instance of the configured application to provide the requested cloud-based computing service, wherein the instance of the configured application is provisioned, executed, and managed at one or more nodes of the execution cluster according to the configured application without further interaction with the computing device.

10. The computing device of claim 9, further comprising pushing configuration data of the created application to the execution cluster, and subsequently instructing the execution cluster to execute the instance of the configured application.

11. The computing device of claim 9 wherein:
the tenant request includes a service description having codes, execution configurations, and associated data; and
generating the tenant model includes generating the tenant model based on the service description and the tenant description.

12. The computing device of claim 9 wherein instructing the execution cluster to execute the instance of the configured application includes delegating execution control of the instance of the created application to the execution cluster.

13. The computing device of claim 9 wherein instructing the execution cluster to execute the instance of the configured application includes delegating at least one of provisioning, starting, or stopping the instance of the created application to the execution cluster.

14. The computing device of claim 9 wherein:
the execution cluster is a first execution cluster;
the computing system further includes a second execution cluster; and
the process performed by the processor further includes selecting at least one of the first or second execution cluster and instructing the selected at least one of the first or second execution cluster to initiate an instance of the created application.

15. The computing device of claim 9 wherein creating the application includes creating a plurality of services individually including computer executable instructions, runtime configurations, data, and execution policies to be followed by the execution cluster during execution, the execution policies of one service being relative to other services of the created application.

16. The computing device of claim 9 wherein creating the application includes creating a plurality of services individually including computer executable instructions, runtime configurations, data, and execution policies to be followed by the execution cluster during execution, wherein the execution policies of one service indicates that the service is to be executed on a different node in the execution cluster than another one of the services.

17. A method for distributed operational control in a computing system configured to provide cloud computing services, the computing system having a control cluster and an execution cluster, the method comprising:
receiving, from the control cluster and at the execution cluster, configuration data of an application to be executed at the execution cluster, the application being configured to provide a client-requested cloud-based computing service, and wherein the application includes one or more services individually including computer executable instructions, runtime configurations, and data identified by the received configuration data;
in response to receiving the configuration data of the application,
deploying, in the execution cluster, instances of the one or more services to individual nodes of the execution cluster for execution; and
instructing the individual nodes of the execution cluster to locally provision, start, and monitor the deployed instances of the one or more services without further interaction with the control cluster to provide the client-requested cloud-based computing service.

18. The method of claim 17, further comprising:
receiving monitored operational parameters of the instances of the services executed on the individual nodes;
determining whether an operational issue exists based on the received operational parameters; and
in response to determining that an operational issue exists, applying remedial measures within the execution cluster without intervention from the control cluster.

19. The method of claim 17, further comprising:
receiving monitored operational parameters of the instances of the services executed on one of the nodes;
determining whether a node failure exists based on the received operational parameters; and
in response to determining that a node failure exists, causing the one or more services deployed on the one of the nodes to migrate to a different node in the execution cluster without intervention from the control cluster.

20. The method of claim 17 wherein deploying instances of the one or more services includes allocating deployment of the instances of the one or more services based on at least one of a processing load or resource availability at the individual nodes.

* * * * *